United States Patent [19]

Timm

[11] 4,163,490
[45] Aug. 7, 1979

[54] LOADING SEAL FOR INCLINED CONVEYOR

[75] Inventor: Ulrich Timm, Wauwatosa, Wis.

[73] Assignee: Rexnord Inc., Milwaukee, Wis.

[21] Appl. No.: 855,094

[22] Filed: Nov. 25, 1977

[51] Int. Cl.² .................... B65G 47/19; B65G 65/52
[52] U.S. Cl. .................................. 198/531; 198/836; 198/525
[58] Field of Search ............... 198/539, 540, 547, 562, 198/607, 606, 688, 698, 699, 735, 822, 836, 616, 703, 557, 549, 559, 772, 565, 525-527, 531, 530

[56] References Cited

U.S. PATENT DOCUMENTS

| | | | |
|---|---|---|---|
| 1,756,584 | 4/1930 | Cope | 198/772 |
| 2,866,536 | 12/1958 | Smallegan | 198/688 |
| 2,988,202 | 6/1961 | Pampel et al. | 198/836 |
| 3,540,569 | 11/1970 | Stone et al. | 198/703 |
| 3,934,718 | 1/1976 | Kupper | 198/616 |
| 3,986,598 | 10/1976 | Grantham | 198/606 |

FOREIGN PATENT DOCUMENTS

| | | | |
|---|---|---|---|
| 501799 | 4/1954 | Canada | 198/540 |
| 2064609 | 7/1972 | Fed. Rep. of Germany | 198/557 |
| 763612 | 5/1934 | France | 198/540 |

*Primary Examiner*—Joseph E. Valenza

[57] ABSTRACT

A hinged gate and flexible loading seal for an inclined conveyor, more particularly for an inclined apron conveyor with pushers for carrying loose, bulk material. The pushers, longitudinally spaced either in staggered arrangement across the conveyor surface or each fully traversing the conveyor width, reduce gross downward movement of the material during conveyor ascent. A segmental gate is hinged above the conveyor in the vicinity of transfer from an unloading conveyor, allows upward passage of the pushers and interrupts downward movement of conveyed material. A flexible, resilient seal fixed above the conveyor and positioned downstream of the hinged gate prevents further downward retreat of escaping conveyed material and redeposits same upstream on advancing pushers.

5 Claims, 10 Drawing Figures

LOADING SEAL FOR INCLINED CONVEYOR

BACKGROUND OF THE INVENTION

1. Field of the Invention

This invention relates to a combination for sealing loose, bulk material against downward movement on an inclined conveyor, and in particular at the material transfer point from a discharging or feeding conveyor or other such device onto an apron conveyor having pusher elements.

2. Description of the Prior Art

Design of inclined conveyors and conveyor systems must necessarily address the inherent problems associated with the propensity of conveyed material, particularily when handled in bulk, unpackaged, unstructured form, to slide down the upward moving conveying surface. In the past this problem has been addressed by arranging conveying systems so the slope of the incline is shallow enough to avoid the backflow tendency. This approach requires lengthier conveyors and corresponding greater floor space dedicated to such use than would otherwise result could the problem be resolved by other means. The use of pushers on the conveying surface is a known attempt to resolve the problem by a mobile damming approach. But at the critical transfer location where material from an overloaded device discharges onto a second and inclined conveyor, a cascade effect results which pushers have been ineffective in preventing.

Solid waste management systems are particularily troublesome with regard to the sealing problem at the foot end of inclined conveyors where the loose, diverse unwieldy waste matter is deposited. Conveyors used in waste treatment plants must transport the material before processing begins from a receiving station, generally to a shredder, where it is pulverized to produce a more homogenous size, a requisite of successive processing steps.

The initial conveyor run in the course from the receiving station to the shredder is usually along a horizontal conveyor often loaded with a depth of eight to ten feet of waste material upon the conveyor surface. This conveyor travels at a slow rate of speed relative to the inclined conveyor onto which the mounded matter is allowed to fall naturally. The speedier inclined device will produce the effect of reducing the material depth to a more tractable and uniform height, preferably approximating the pusher height above the conveyor surface. In this way, the pusher elements will maintain the material in position of the conveyor in the course of vertical travel.

Because of the tremendous quantities of refuse processed daily at plants of this type, it is especially important to contain the material completely during the operating cycle against errant motion. Continual escape of material discharging from one conveyor, if allowed to proceed unabated, will quickly mound up at the foot of the receiving conveyor with the result that operating safety and efficiency are soon reduced beyond tolerable levels. The magnitude of the problem is such that given the volume of the material handled, even granular substances contained in the refuse, if allowed to bypass the receiving device, will accumulate at its foot at such a rate as to require shutdown and removal several times during a workday.

Granular matter in the form of broken glass, sand, etc., is especially difficult to seal against when intermixed, as it always is, with sizable refuse such as tree limbs, auto parts, paper, furniture, etc. The invention disclosed herein is an efficient, reliable solution to the problems discussed.

SUMMARY OF THE INVENTION

The seal and gate combination invention disclosed and claimed achieves the principal objective of preventing or at least minimizing the leakage of loose, diverse conveyed material at the loading area of an inclined conveyor. The invention proposes the use of a rigid gate positioned downstream of the loading point, hinged above the conveying surface for blocking backward flowing material from exiting the conveyor along the axis of transport but opposite the intended directional sense of conveyance. The gate may be segmented across its width to allow the upward passage of rows of staggered pushers attached to the conveyor surface or unitary, where pusher elements are in a single row. A flexed elastic seal located behind the gate and positioned in its static or resting mode so as to contact the moving conveyor surface, is capable of flexing to provide clearance when being contacted by the advancing pusher elements. The elastic seal is particularly effective in arresting the retreat of fine, loose, granular and powdered material which has escaped the checking action of the hinged gate.

BRIEF DESCRIPTION OF THE DRAWINGS

FIG. 7 is a front elevation view taken along the plane 7—7 of FIG. 6 of the elastic seal assembly shown in the rest position during the interval between pusher interaction;

DESCRIPTION OF THE PREFERRED EMBODIMENT

Figure 1:
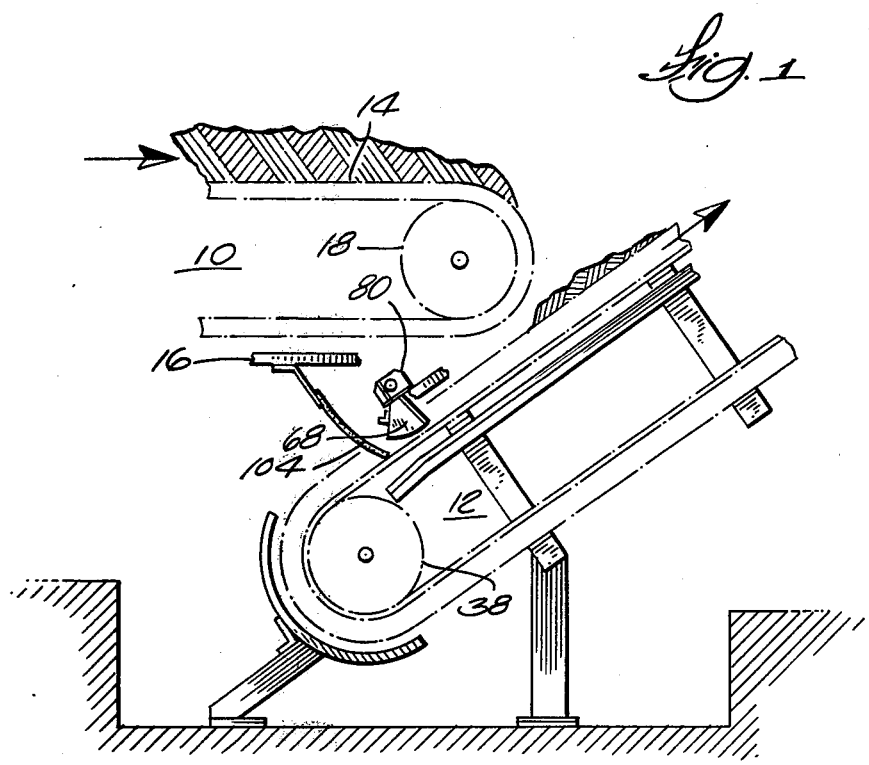
FIG. 1 is an elevation view illustrating the approximate locations of a discharging conveyor, an inclined conveyor and the gate-seal combination.

In FIG. 1 there is shown a general arrangement of the discharging end of a horizontal running conveyor 10 and the foot end of an inclinded pan or apron conveyor 12 which arrangement is typically used in carrying solid waste material at processing plants that shred, classify, separate, and dispatch recoverable constituents. In the following discussion reference is made to the discharging unit being a horizontal conveyor but it could be a conveyor of any type or orientation or a loading unit of any type including one constituting merely a plow pushing material from a storage surface onto the inclined conveyor as described.

The discharging conveyor has a conveying surface 14 upon which is carried the waste material and below such conveyor, under the return run of the conveying surface 14, is located a dribble pan 16 to catch and retain material still adhering to the surface 14 after rotating about the head sprocket 18 where discharge is intended and for the most part occurs.

Figure 2:
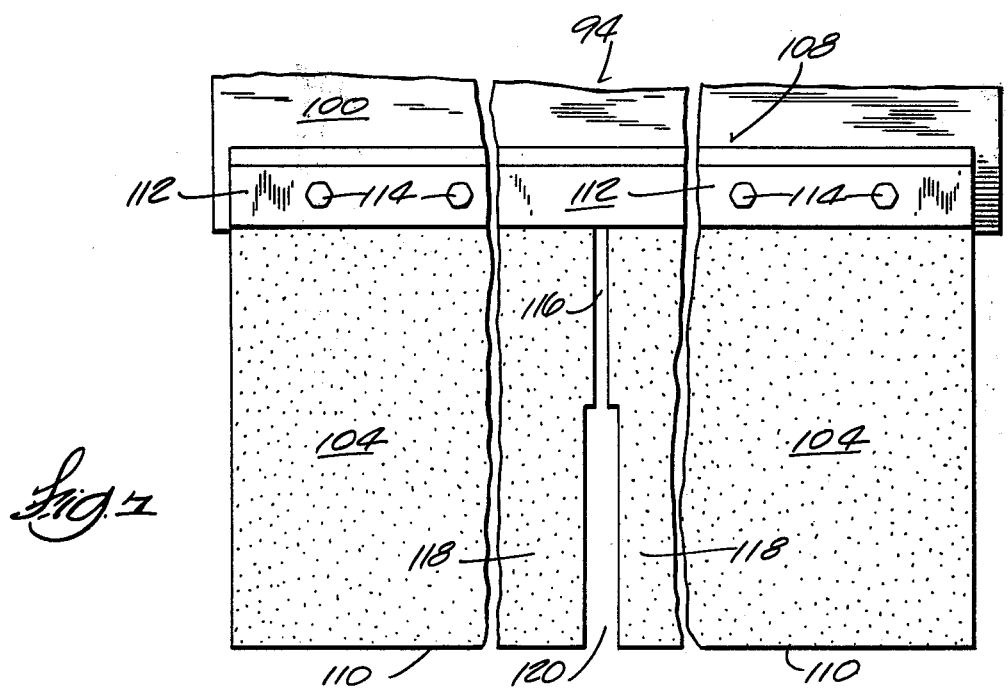
FIG. 2 is a top plan view of the side portion of a typical inclined pan-type apron conveyor.
Figure 3:
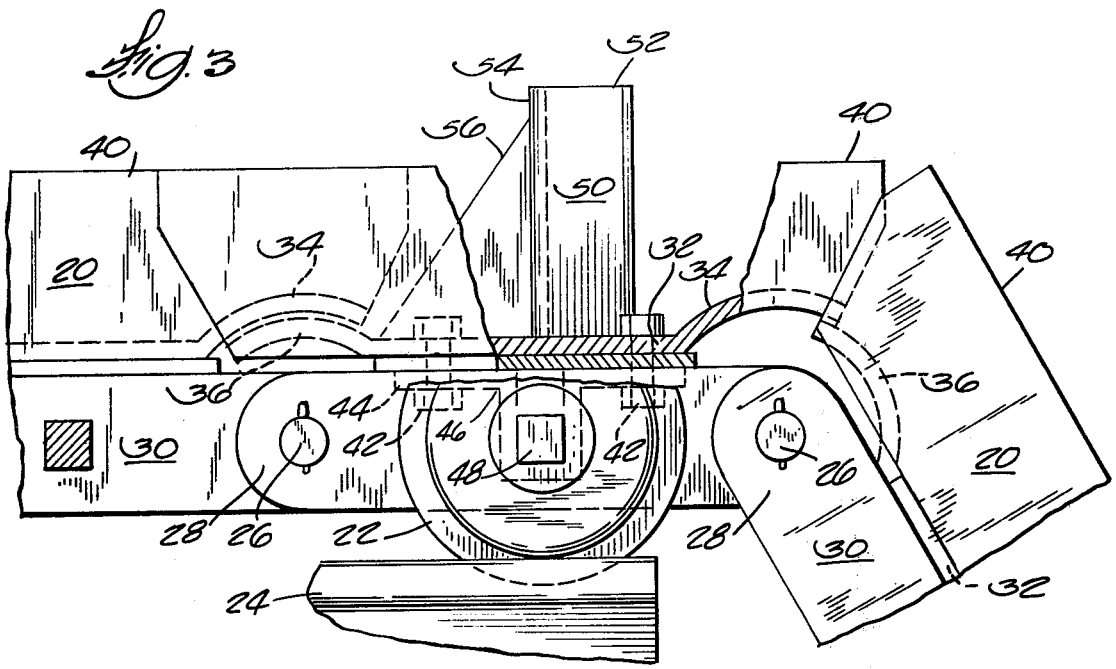
FIG. 3 is a side elevation of the conveyor shown in FIG. 2.
Figure 2:
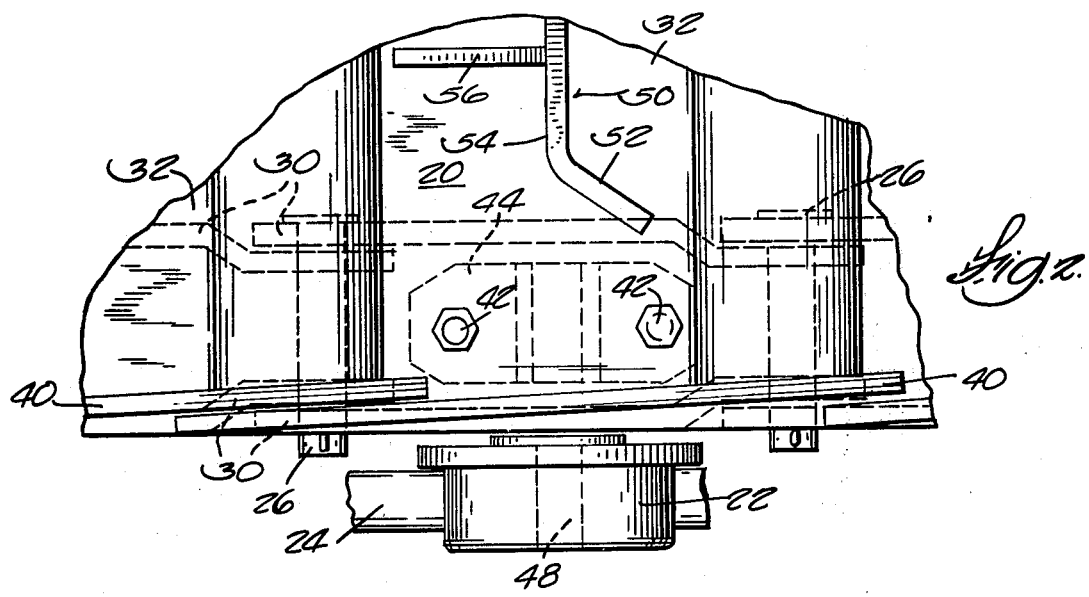

The inclined conveyor 12 as illustrated in FIGS. 2 and 3 is an assembly of interconnected pans 20 mounted upon rollers 22 which roll on tracks 24 connected to the structural framework that ultimately transfers the load to the ground support. The pan assemblies are joined to each other with conveyor chain that includes connecting pins 26 inserted thru lugs 28 formed in the ends of sidebar chain links 30. An endless chain is formed of the pans so assembled for transporting waste from the foot to the elevated head where the conveyor 12 then discharges the waste to a shredder or other device in the processing cycle.

Conventional attachment, fabrication and assembly techniques are used in the conveyor construction but description of the features of the elements and operational interrelationship is crucial to an understanding of the problems caused by the design as it effects sealing the waste against errant downward movement along the conveyor axis.

The pans are identical one to another and are of welded construction with a base or apron 32 formed with a leading bead 34 and a trailing bead 36 each forming a cylindrical surface protruding within the pan and extending across the conveyor width. In crossection, the beads have circular contours comprising arcs of circles the leading bead 34 having a greater radius than the trailing bead 36 and sized so the trailing bead 36 of the preceding pan will nest under the leading bead 34 of the next succeeding pan. Assembly of the chain allows for arcuate overlap of contiguous pan apron surfaces at all times, both during the upward ascent and at the foot and head terminal points where the chain rotates about head and foot shaft sprockets 38. Rotation at the sprockets 38 causes a reduction in the overlap since the forward pan rotates to begin the return run before the following pan enters the turn. Apron bead design of the preferred bead radii of curvature is such that a minimal overlap of about one-half inch always exists at the foot and head terminal points.

Welded to the apron 32 at the lateral extremities thereof are plate sides 40 extended roughly vertically from the apron 32 a suitable distance to contain the waste material within the three sided container formed by sides 40 and apron 32. The planform shape of each side 40 conforms to the beaded leading and trailing contour of the apron 32.

Each pan 20 is typically supported by a roller 22 attached to the pan apron surface 32 at each lateral edge thereof by means of a two bolt 42 attachment thru the apron surface 32 and the horizontal flanges 44 of a local hat section 46. Each roller rides on a track 24 positioned adjacent the conveyor run and parallel to the run. Sidebar links 30 extend along the conveyor axis, are located below the apron conveying surface 32 at each lateral edge and have lugs formed therein coaxial with the roller shafts 48. Bearings are inserted within the bores and allow ease of rotation on the roller shafts 48 relative to the sidebar links 30 and transmit roller supporting forces to the pan by couple action developed via radially directed bearing forces, which in turn are ultimately applied to the pan by the bolts 42.

Figure 4:
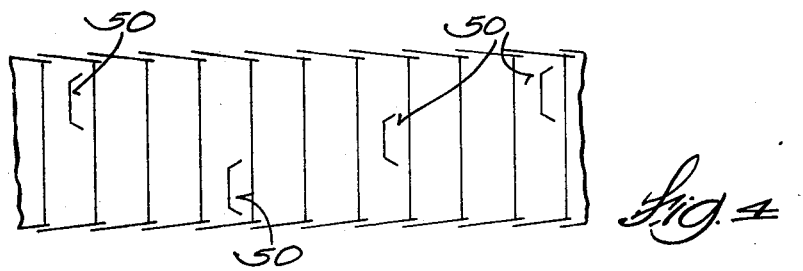
FIG. 4 is a top plan view of the conveying surface of the conveyor shown in FIGS. 2 and 3 illustrating a typical staggered pusher arrangement.

Attached to the apron conveying surface, usually by welding, are pusher elements 50 located at staggered positions along and across the apron surfaces in the assembled chain of pans. The staggered pattern results since the pans 20 have the pushers located at lateral positions which differ from the corresponding pusher positions on the next succeeding pan assembly. In addition, between the pusher-mounted pans, the chain is assembled with intermediate pans having no pusher elements. In this way the arrangement shown in FIG. 4 results and is particularily effective in conveying systems of the type carrying loose, waste material.

The pushers 50 are formed from rectangular plate material to create a channel section having end flanges 52, one at either end of a flat web 54, which extend in the same direction from the web 54. Attached to the web may be welded a flange 56 protruding from the web mid-point and extending opposite the direction of the end flanges 52. The pusher is installed with the web 54 and flanges 52, 56 nearly perpendicular to the apron 32 and is typically welded to the apron. It is positioned so that the end flanges 52 are directed toward the direction of conveyor travel while the mid-point flange 56, if used at all, is directed opposite the direction of travel.

Figure 5:
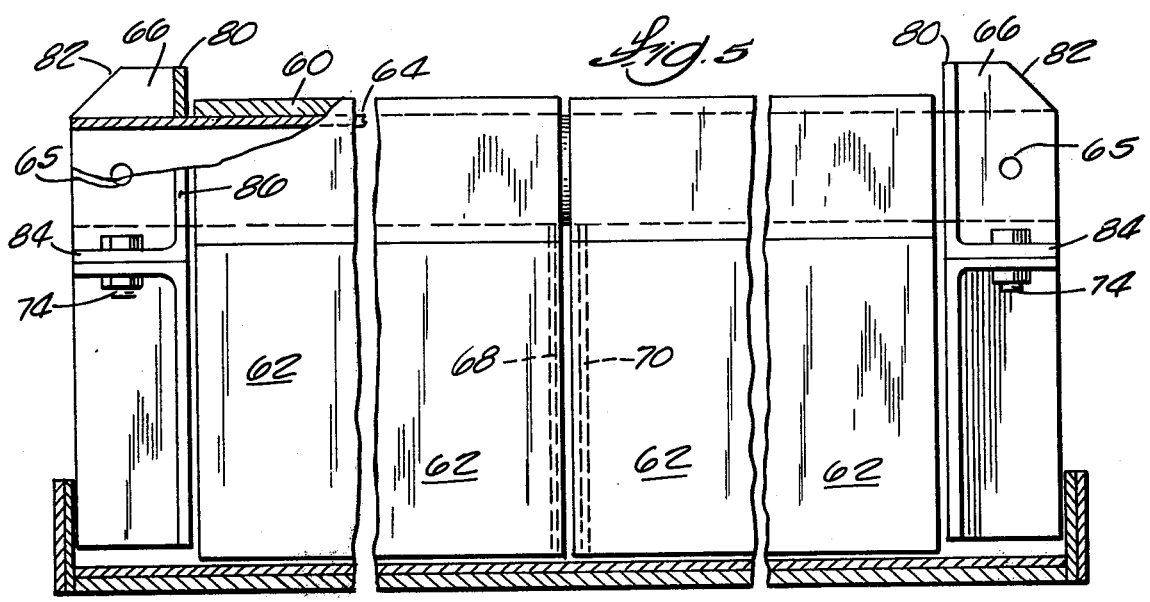
FIG. 5 is a front elevation view of the hinged gate assembly shown in the rest position during the interval between pusher interaction.
Figure 6:
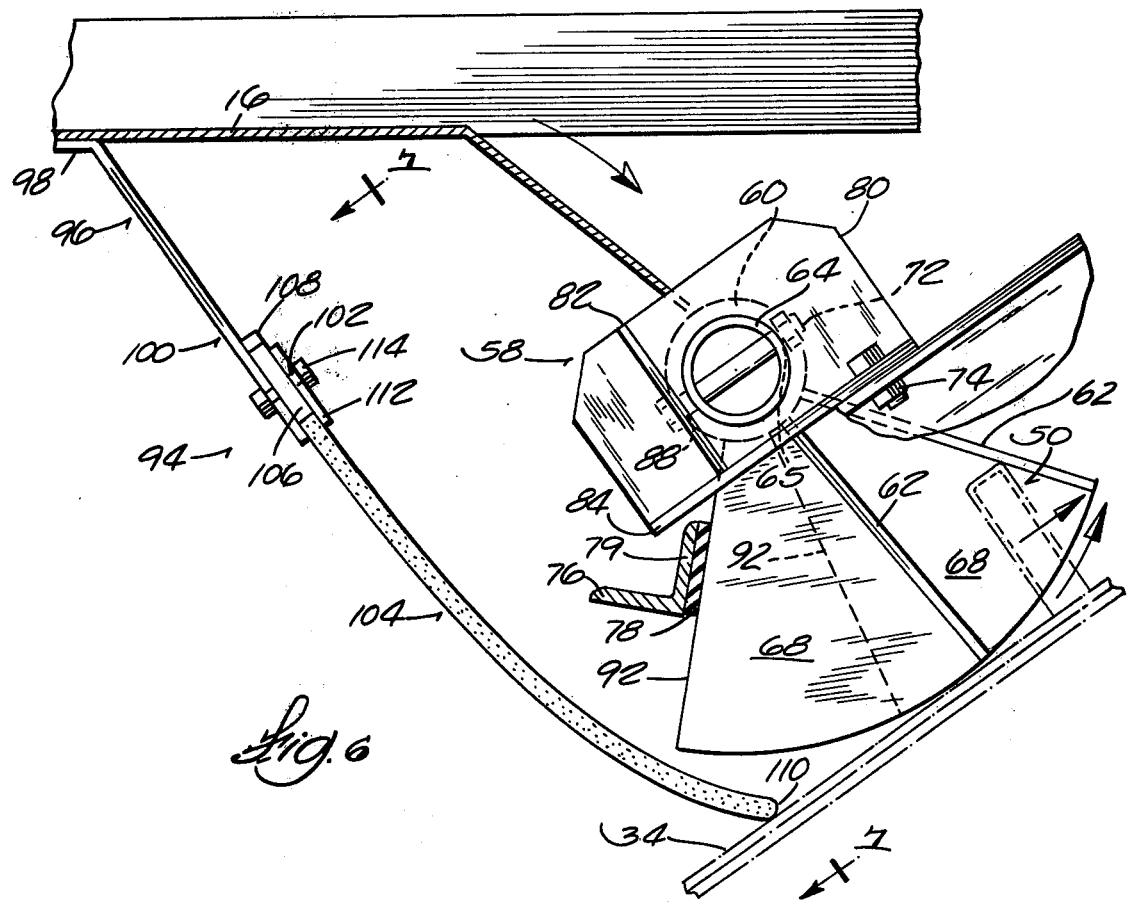
FIG. 6 is a side elevation view of the hinged gate assembly of FIG. 5.

A hinged gate assembly 58, as shown in FIGS. 6, is mounted so the axis of its rotation is above the inclined conveyor 12, parallel to the inclined planar surface formed by adjoined pan assemblies 20 and normal to the direction of conveyor travel. The assembly 58 in a preferred embodiment, shown in FIGS. 5-6, includes six discrete elements, namely outer shafts 60, a flat plate 62, an inner shaft 64, two end brackets 66, gate flanges 68, 70, and two restraining pins 72.

The gate assembly 58 is positioned and sized to allow the plate 62 to marginally clear the top of the leading beads 34, so that the angle formed by a perpendicular drawn from the conveying surface of the apron 32 and the gate position, when resting on the stop 76, is approximately 10 degrees as measured from the perpendicular in the direction of conveyor travel. Furthermore, the plate 62 is prevented from backward rotation and held in the above-described angular position by the restraining action of the stop 76 contacting the edge of the flanges 68, 70 which extend from the plates 62.

The stop 76 is provided to limit the rearward excursion of the gate so that its lower edge clears the top of the leading beads 34 by about 1/16 inch. The stop has a rubber pad 78 mounted on the face of an extended surface 79 to reduce impact forces developed between the stop and gate and to minimize the noise resulting therefrom. The stop 76 may additionally limit movement of the elastic seal assembly, the operation of which is later described.

The inner shaft 64 is a circular cylindrical shaft of either solid or tubular construction, coaxial with the above-defined hinged gate assembly axis and extends across the total width of the apron 32, and in excess thereof, an amount sufficient to allow pivotal mounting at its extremities within the end brackets 66. Transverse holes 65 are located in the end portions of the shaft 64 on a colinear diametric centerline. The brackets 66 are positioned one at each end of the inner shaft 64 and have vertical support webs 80 thru which are drilled holes 86 capable of accepting the inner shaft ends which rest on, and are supported by, the drilled cylindrical surfaces. Transverse webs 82 are welded to the vertical support webs 80 and the base 84 and have in each a drilled circular hole 88 positioned normal to and aligned with the inner shaft axis. A restraining pin 72 is fitted in each hole 88 and in the holes 65 to provide torsional restraint to the inner shaft. The gate assembly 58 is mounted to its supporting structure by bolts 74 inserted thru holes drilled in the bracket base 84, which bolts provide the attachment.

Outer shafts 60 of circular cylindrical tubular construction, having an inside diameter somewhat larger than the outside diameter of the inner shaft 64, are fitted over the inner shaft and are sized lengthwise to traverse the inner shaft length as measured between the inner surfaces of the vertical support webs 80, with an appropriate clearance to allow for angular motion relative to the inner shaft. Welded to each outer shaft 60 are rectangular plates 62, joined on an edge to the outer cylindrical surface of the shaft 60 and extending along the shaft length.

An individual plate-outer shaft subassembly comprises a gate element capable of rotation relative to the torsionally restrained inner shaft and rotation relative to each other gate subassembly. The length of each gate subassembly approximates the width of an individual row of pushers 50 mounted on the apron 32 and is aligned with a corresponding pusher row so that the pusher row when ascending the conveyor contacts only one gate subassembly. For example, the embodiment described and illustrated in FIGS. 5 and 6 has three pusher rows and three gates. In this configuration, the plates 62 have planar flanges 68 and 70 having the profile of a circular segment welded to the trailing surface thereof along a vertical edge. The inner diameter of the segment conforms to the outer shaft 60 outside diameter since typically the weld joins the flanges to the outer shaft. The outer diameter of the segment is selected to approximate the radius of the gate subassembly as measured from its pivot axis to the outer edge or tip of the plates 62. Intermediate gates have flanges welded to each lateral edge but outer gates typically have one flange welded to their inner lateral edges. The included angle of the circular segment profile of the flanges is generally about 40 degrees.

An elastic seal assembly 94 is mounted to stationary structure, possibly the dribble pan 16 of the discharging conveyor 10, and is positioned on the trailing side of the hinged gate subassembly, but in proximity and operational relationship thereto, so as to co-act with the pushers 50 and the gates 58 in producing the intended inventive result. The seal assembly 94, shown in FIGS. 6–7, includes an angle 96 extending across the conveyor width, having a horizontal leg 98 mounted by welding to the under surface of the dribble pan 16, and having a second outstanding leg 100, extending outwardly from the dribble pan 16 and approximately perpendicular to the conveyor's upward ascending apron surface 32. The second leg 100 has a plurality of holes 102 formed near its free edge and spacedly distributed across the length of the angle. A flexible, planar seal 104 of resilient, elastic material having a rectangular shape and uniform thickness is positioned with a longitudinal edge 108 placed over the upper surface of the second leg 100. It extends across the conveyor width and is positioned so that its lengthwise ends are approximately aligned with the corresponding ends of the angle 96. Slotted holes 106 are formed in the seal 104 near the edge 108, aligned parallel with the transverse axis of the seal and spaced to conform with the corresponding holes 102 in the angle leg 100. A plate gasket 112, likewise extending across the conveyor width and aligned similiarily as the seal 104 and angle 96, is positioned over the upper seal surface at its edge 108 and fastened therethrough with pins 114 which extend thru the gasket 112, seal 104 and angle 96. The pins 114 are retained with a loose axial and radial fit so as to allow motion of the seal 104 relative to the gasket and angle.

The seal 104 has slots 116, parallel to its transverse axis and extending from the free edge 110 to the lower edge of the gasket 112, which form seal segments 118, each capable of flexing independently of the other segments. An unillustrated alternative provides for the described arrangement, except that the seal 104 is not of unitary construction with slots 116 forming seal segments, but rather is comprised of individual discrete members positioned edgewise across the conveyor width each capable of independent flapwise motion. Whether of unitary or segmental construction, the seal should have provision for a widened slotted area 120, or alternatively, a space between adjacent seals to allow clearance for the gate flanges 68, 70 to pass without affecting motion of the seal 104.

Figure 10:
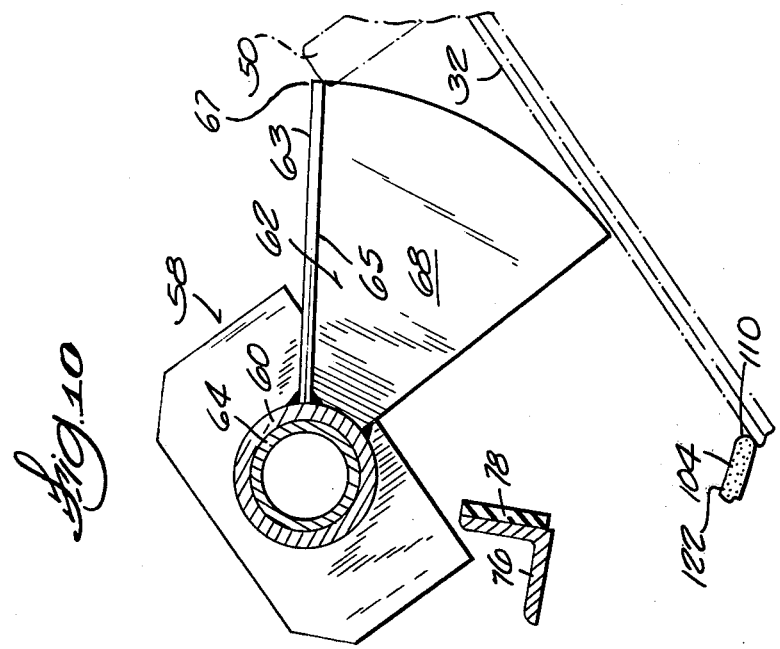
FIG. 10 is a side elevation of the respective relative positions of the elements in FIGS. 8 and 9 at the instant the same pusher last clears the hinged gate.
Figure 9:
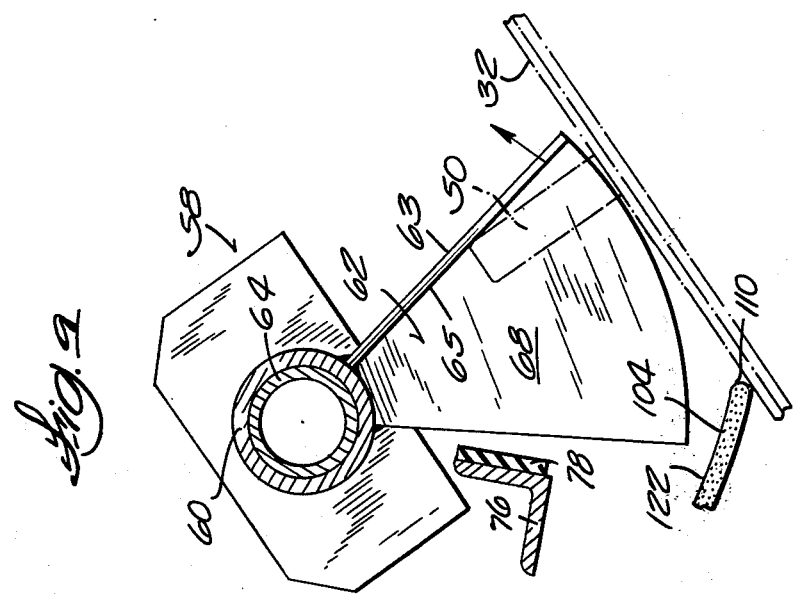
FIG. 9 is a side elevation of the respection relative positions of the elements in FIG. 8 at the instant subsequent to the same pusher first contacting the hinged gate.
Figure 8:
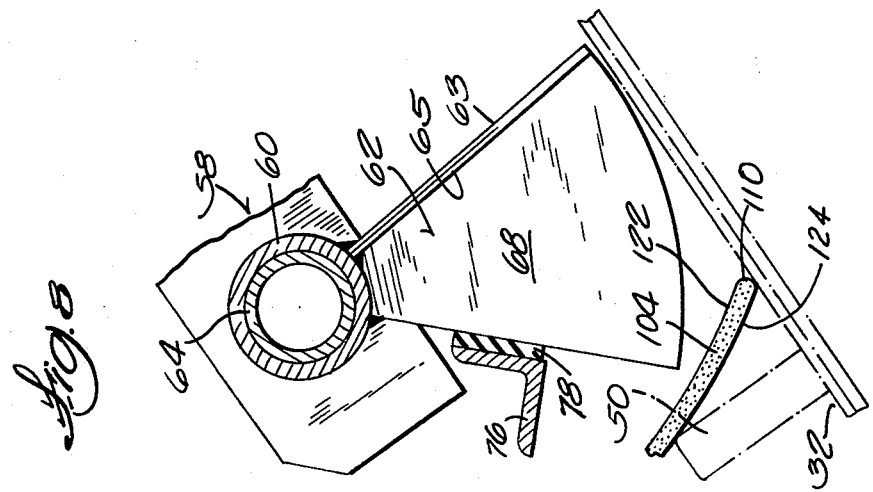
FIG. 8 is a side elevation of the relative positions of the pushers, hinged gate and seal at the instant prior to the pusher first contacting the seal.

The functional interaction of the pushers, hinged gate and flexible seal is next described to summarize the use and operation of the claimed invention above described. FIGS. 8, 9 and 10 show certain pertinent positions of the three co-acting members which through concerted action produce the desired result as the conveyor advances in ascent past the sealing area.

FIG. 8 illustrates the hinged gate 58 in its fully closed position with its plate 62 marginally clearing the inclined, moving apron surface 32 as it rests on the stop 76. At this point, the free edge of the seal 110 is likewise contacting the apron surface 32 while maintaining a slightly flexed posture producing, by way of the elastic nature of the seal 104 material, a downwardly directed force on the apron 32. The positive force preloading the seal prevents backward passage of waste material, particularily fine and powdered matter, which may have bypassed the sealing action of the hinged gate further to be described. The pusher 50, in axial alignment with the associated and corresponding gate and seal, is shown in position to imminently contact the seal. As the pusher 50 proceeds, contact with the trailing surface 124 of the seal results causing the seal flexure to increase. The pusher contacts the seal well above its free edge and produces a change in bending curvature of the seal such that waste material collecting on the leading seal surface 122 is deposited downwardly forward of the contacting pusher. The material so deposited is carried up the conveyor by the damming action of the pusher. On clearing the pusher the seal is free to snap back into preloaded, flexed contact with the apron surface.

FIG. 9 shows the same pusher in a later position, after contact with the trailing hinged gate surface 65 while the gate is near its fully closed position. Waste material exiting from the discharging conveyor 10 during the interval since the passage of the preceding pusher is collecting on the leading gate surface 63. The pusher proceeds to contact the gate, and in so doing to cause rotation of the gate about its pivot axis through an arcuate path to a point where the advancing pusher just clears the lower or free edge 67 of the gate, as is illustrated in FIG. 10. During the period from initial pusher-gate contact to final pusher-gate clearance, the waste material collecting on the leading gate surface 63 is deposited forward of the pusher by sliding action off the gate onto the apron 32, and hence is carried up the conveyor urged along by the damming action of the pusher. On clearing the pusher, the gate is free to swing about its pivot axis backwardly by pendulum action produced by gravity forces acting on the gate eccentric of the axis. The hinged gate and seal are then in the position shown in FIG. 8 and await contact with the next ascending pusher which contact progressively produces the identical action as just described.

Throughout this process the circular segmental gate flanges 68, 70 operate to minimize sideward movement of the waste material from one bay or row to another. There is produced a blocking action since, due to the spaced-apart disposition of pushers, only one gate-seal-pusher combination is active at a given time. Hence, only one gate is open at a given time so passage of waste material tending to circumvent the gate is minimized by the flanges 68, 70.

What is claimed is:

1. A seal and gate combination for sealing conveyed material against rearward movement on an upwardly operating inclined conveyor, comprising:
   (a) a conveying surface for support and transport of the conveyed material and being positioned to receive discharge of conveyed material from a feeding means;
   (b) pusher means attached to said conveying surface and extending outwardly therefrom for urging the conveyed material up said inclined conveyor, said pusher means further comprising,
      (1) at least two rows of pusher elements, and,
      (2) the pusher elements of each row aligned in the direction of conveyor travel and staggered with respect to the pusher elements of each laterally adjacent row;
   (c) gate means for blocking the rearward movement of conveyed material on said conveying surface pivotally mounted above said inclined conveyor and rearward of said feeding means on an axis parallel to the conveying surface and normal to the direction of travel thereof, said gate means further comprising, a gate element for each row of pusher elements, aligned therewith in the direction of conveyor travel and adapted to rotate upwardly about said axis independently of other of said gate elements as said gate element is contacted by a pusher element on the advancing conveying surface, each gate element comprises,
      (1) a generally rectangular plate having a lower edge parallel to its axis of rotation and lying closely spaced from the conveying surface;
      (2) a gate flange attached to each plate at a lateral edge thereof adjacent the gate element of each laterally adjacent row;
      (3) each gate flange extending rearwardly from said plate and perpendicular thereto and having the shape of a circular segment with its center on the axis of rotation of said gate means; and
      (4) the lower edge of said flange having a radius approximately equal to the radius of the arc defined by the lower edge of the plate as it pivots about the axis of rotation,
   (d) seal means positioned behind said gate means and depending from above the conveying surface for further blocking the rearward movement of conveyed material on the conveying surface, said seal means further comprising, a flexible seal segment for each row of pusher elements, aligned therewith and with the gate element for said row and adapted to bend upwardly and away from the conveying surface as said seal segment is contacted by a pusher element.

2. The combination as defined in claim 1 wherein each of said flexible seal segments is mounted with its lower edge in sliding preloaded contact with said conveying surface.

3. The combination as defined in claim 1 wherein said gate means further comprises a stop mounted rearwardly thereof and adapted to limit the rearward rotation of said gate elements.

4. The combination as defined in claim 3 wherein the included angle of the circular segment of said gate flange is approximately equal to the angle through which said gate element rotates between said stop and the upward limit of rotation as said gate element is contacted by an advancing pusher element.

5. The combination as defined in claim 4 wherein the rearward rotation of said gate elements is limited by contact between the rearward edges of said gate flanges and said stop.